(12) United States Patent
Constantz et al.

(10) Patent No.: US 7,744,761 B2
(45) Date of Patent: *Jun. 29, 2010

(54) DESALINATION METHODS AND SYSTEMS THAT INCLUDE CARBONATE COMPOUND PRECIPITATION

(75) Inventors: Brent R. Constantz, Portola Valley, CA (US); Kasra Farsad, San Jose, CA (US); Miguel Fernandez, San Jose, CA (US)

(73) Assignee: Calera Corporation, Los Gatos, CA (US)

( * ) Notice: Subject to any disclaimer, the term of this patent is extended or adjusted under 35 U.S.C. 154(b) by 153 days.

This patent is subject to a terminal disclaimer.

(21) Appl. No.: 12/163,205

(22) Filed: Jun. 27, 2008

(65) Prior Publication Data

US 2009/0001020 A1 Jan. 1, 2009

Related U.S. Application Data

(60) Provisional application No. 61/017,392, filed on Dec. 28, 2007, provisional application No. 61/073,326, filed on Jun. 17, 2008, provisional application No. 60/937,786, filed on Jun. 28, 2007.

(51) Int. Cl.
*B01D 61/10* (2006.01)

(52) U.S. Cl. .......................... 210/652; 203/10; 210/710; 210/718; 423/165; 423/220; 423/430; 588/252

(58) Field of Classification Search ................. 210/639, 210/650, 652, 702, 710, 714, 717, 718, 723, 210/724, 726, 768–774, 806; 203/10, 39; 423/170, 184, 430, 431, 437.1, 438, 439, 423/441, 165, 220, 223, 232, 155, 158, 186, 423/189, 265; 106/461, 462, 638, 640, 647, 106/654, 668, 705, 811–819, 713, 733–739, 106/745; 404/17, 44; 588/249, 252, 313, 588/400, 404; 52/294, 750
See application file for complete search history.

(56) References Cited

U.S. PATENT DOCUMENTS 1,678,345 A 7/1928 Mattison (Continued)

FOREIGN PATENT DOCUMENTS

AU 2007100157 4/2007

(Continued)

OTHER PUBLICATIONS

Publication: "Existing & Emerging Concentrate Minimization & Disposal Practices for Membrane Systems"; Sandeep Sethi, Steve Walker, Jorg Drewes and Pei Xu; Florida Water Resources Journal, Jun. 2006, pp. 38,40,42,44,46 and 48.*

(Continued)

*Primary Examiner*—Joseph W Drodge
(74) *Attorney, Agent, or Firm*—Bozicevic, Field & Francis, LLP (57) ABSTRACT

Desalination methods that include carbonate compound precipitation are provided. In certain embodiments, feed water is subjected to carbonate compound precipitation conditions prior to desalination. In certain embodiments, desalination waste brine is subjected to carbonate compound precipitation conditions. In yet other embodiments, both feed water and waste brine are subjected to carbonate compound precipitation conditions. Aspects of embodiments of the invention include carbon dioxide sequestration. Embodiments of the invention further employ a precipitate product of the carbonate compound precipitation conditions as a building material, e.g., a cement. Also provided are systems configured for use in methods of the invention.

13 Claims, 5 Drawing Sheets

U.S. PATENT DOCUMENTS

| | | | |
|---|---|---|---|
| 1,865,833 A | 7/1932 | Chesny | |
| 1,897,725 A | 2/1933 | Gaus et al. | |
| 2,304,391 A * | 12/1942 | Zimmerman | 106/638 |
| 2,329,940 A | 9/1943 | Ponzer | |
| 2,383,674 A | 8/1945 | Osborne | |
| 2,458,039 A | 1/1949 | Wait et al. | |
| 2,606,839 A | 8/1952 | Evans et al. | |
| 2,934,419 A * | 4/1960 | Cook | 71/1 |
| 2,967,807 A | 1/1961 | Osborne et al. | |
| 3,046,152 A | 7/1962 | Tsuneyoshi | |
| 3,120,426 A * | 2/1964 | Crawford, Jr. | 423/432 |
| 3,179,579 A | 4/1965 | Gustave et al. | |
| 3,202,522 A | 8/1965 | Yang et al. | |
| 3,350,292 A | 10/1967 | Weinberger et al. | |
| 3,374,164 A | 3/1968 | Balej et al. | |
| 3,420,775 A | 1/1969 | Cadwallader | |
| 3,463,814 A | 8/1969 | Blanco et al. | |
| 3,511,595 A | 5/1970 | Fuchs | |
| 3,511,712 A | 5/1970 | Giner | |
| 3,525,675 A | 8/1970 | Gaudin | |
| 3,558,769 A | 1/1971 | Globus | |
| 3,627,479 A | 12/1971 | Yee | |
| 3,627,480 A * | 12/1971 | Birchall | 423/431 |
| 3,630,762 A | 12/1971 | Olton et al. | |
| 3,725,267 A | 4/1973 | Gelblum | |
| 3,861,928 A * | 1/1975 | Slater et al. | 106/717 |
| 3,864,236 A | 2/1975 | Lindstrom | |
| 3,904,496 A | 9/1975 | Harke et al. | |
| 3,917,795 A | 11/1975 | Pelczarski et al. | |
| 3,925,534 A | 12/1975 | Singleton et al. | |
| 3,953,568 A | 4/1976 | Seko et al. | |
| 3,963,592 A | 6/1976 | Lindstrom | |
| 3,970,528 A | 7/1976 | Zirngiebl et al. | |
| 4,026,716 A | 5/1977 | Urschel, III et al. | |
| 4,036,749 A | 7/1977 | Anderson | |
| 4,080,270 A | 3/1978 | O'Leary et al. | |
| 4,107,022 A | 8/1978 | Strempel et al. | |
| 4,128,462 A | 12/1978 | Ghiringhelli et al. | |
| 4,140,510 A | 2/1979 | Scholze et al. | |
| 4,147,599 A | 4/1979 | O'Leary et al. | |
| 4,188,291 A | 2/1980 | Anderson | |
| 4,217,186 A | 8/1980 | McRae | |
| 4,242,185 A | 12/1980 | McRae | |
| 4,246,075 A | 1/1981 | Hilbertz | |
| 4,264,367 A | 4/1981 | Schutz | |
| 4,335,788 A | 6/1982 | Murphey et al. | |
| 4,361,475 A | 11/1982 | Moeglich | |
| 4,370,307 A | 1/1983 | Judd | |
| 4,376,101 A | 3/1983 | Sartori et al. | |
| 4,410,606 A | 10/1983 | Loutfy et al. | |
| 4,450,009 A | 5/1984 | Childs et al. | |
| 4,477,573 A | 10/1984 | Taufen | |
| 4,561,945 A | 12/1985 | Coker et al. | |
| 4,588,443 A | 5/1986 | Bache | |
| 4,620,969 A | 11/1986 | Wilkinson | |
| 4,716,027 A | 12/1987 | Morrison | |
| 4,804,449 A | 2/1989 | Sweeney | |
| 4,818,367 A | 4/1989 | Winkler | |
| 4,838,941 A | 6/1989 | Hill | |
| 4,899,544 A | 2/1990 | Boyd | |
| 4,915,914 A | 4/1990 | Morrison | |
| 4,931,264 A | 6/1990 | Rochelle et al. | |
| 5,037,286 A | 8/1991 | Roberts | |
| 5,100,633 A | 3/1992 | Morrison | |
| 5,230,734 A | 7/1993 | Kumasaka et al. | |
| 5,246,551 A | 9/1993 | Pletcher et al. | |
| 5,282,935 A | 2/1994 | Cawlfield et al. | |
| 5,362,688 A | 11/1994 | Porta et al. | |
| 5,364,611 A | 11/1994 | Iijima et al. | |
| 5,366,513 A | 11/1994 | Goldmann et al. | |
| 5,470,671 A | 11/1995 | Fletcher et al. | |
| 5,520,898 A * | 5/1996 | Pinnavaia et al. | 423/244.04 |
| 5,531,821 A | 7/1996 | Wu | |
| 5,531,865 A | 7/1996 | Cole | |
| 5,547,027 A | 8/1996 | Chan et al. | |
| 5,584,923 A | 12/1996 | Wu | |
| 5,584,926 A | 12/1996 | Borgholm et al. | |
| 5,595,641 A | 1/1997 | Traini et al. | |
| 5,614,078 A | 3/1997 | Lubin et al. | |
| 5,624,493 A | 4/1997 | Wagh et al. | |
| 5,690,729 A * | 11/1997 | Jones, Jr. | 106/682 |
| 5,702,585 A | 12/1997 | Hillrichs et al. | |
| 5,766,338 A | 6/1998 | Weber | |
| 5,766,339 A | 6/1998 | Babu et al. | |
| 5,776,328 A | 7/1998 | Traini et al. | |
| 5,785,868 A | 7/1998 | Li et al. | |
| 5,803,894 A * | 9/1998 | Kao et al. | 588/257 |
| 5,846,669 A | 12/1998 | Smotkin et al. | |
| 5,855,666 A * | 1/1999 | Kao et al. | 106/718 |
| 5,855,759 A | 1/1999 | Keating et al. | |
| 5,897,704 A * | 4/1999 | Baglin | 106/696 |
| 5,925,255 A | 7/1999 | Mukhopadhyay | |
| 5,965,201 A * | 10/1999 | Jones, Jr. | 427/243 |
| 6,024,848 A | 2/2000 | Dufner et al. | |
| 6,059,974 A | 5/2000 | Scheurman, III | |
| 6,071,336 A | 6/2000 | Fairchild et al. | |
| 6,080,297 A | 6/2000 | Ayers | |
| 6,090,197 A | 7/2000 | Vivian et al. | |
| 6,129,832 A | 10/2000 | Fuhr et al. | |
| 6,180,012 B1 | 1/2001 | Rongved | |
| 6,190,428 B1 | 2/2001 | Rolison et al. | |
| 6,200,381 B1 | 3/2001 | Rechichi | |
| 6,200,543 B1 | 3/2001 | Allebach et al. | |
| 6,217,728 B1 | 4/2001 | Lehmann et al. | |
| 6,235,186 B1 | 5/2001 | Tanaka et al. | |
| 6,248,166 B1 * | 6/2001 | Solsvik | 106/737 |
| 6,251,356 B1 | 6/2001 | Mathur | |
| 6,264,740 B1 * | 7/2001 | McNulty, Jr. | 106/817 |
| 6,280,505 B1 | 8/2001 | Torkildsen et al. | |
| 6,352,576 B1 | 3/2002 | Spencer et al. | |
| 6,375,825 B1 | 4/2002 | Mauldin et al. | |
| 6,387,212 B1 | 5/2002 | Christian | |
| 6,402,831 B1 | 6/2002 | Sawara et al. | |
| 6,416,574 B1 | 7/2002 | Steelhammer et al. | |
| 6,444,107 B2 | 9/2002 | Hartel et al. | |
| 6,475,460 B1 | 11/2002 | Max | |
| 6,495,013 B2 | 12/2002 | Mazur et al. | |
| 6,517,631 B1 * | 2/2003 | Bland | 106/705 |
| 6,518,217 B2 | 2/2003 | Xing et al. | |
| 6,537,456 B2 | 3/2003 | Mukhopadhyay | |
| 6,602,630 B1 | 8/2003 | Gopal | |
| 6,623,555 B1 | 9/2003 | Haverinen et al. | |
| 6,638,413 B1 | 10/2003 | Weinberg et al. | |
| 6,648,949 B1 | 11/2003 | Der et al. | |
| 6,712,946 B2 | 3/2004 | Genders et al. | |
| 6,755,905 B2 | 6/2004 | Oates et al. | |
| 6,776,972 B2 | 8/2004 | Vohra et al. | |
| 6,786,963 B2 | 9/2004 | Matherly et al. | |
| 6,841,512 B1 | 1/2005 | Fetcenko et al. | |
| 6,890,419 B2 | 5/2005 | Reichman et al. | |
| 6,890,497 B2 | 5/2005 | Rau et al. | |
| 6,908,507 B2 | 6/2005 | Lalande et al. | |
| 6,936,573 B2 | 8/2005 | Wertz et al. | |
| 7,037,434 B2 | 5/2006 | Myers et al. | |
| 7,040,400 B2 | 5/2006 | de Rouffignac et al. | |
| 7,132,090 B2 | 11/2006 | Dziedzic et al. | |
| 7,135,604 B2 | 11/2006 | Ding et al. | |
| 7,198,722 B2 | 4/2007 | Hussain | |
| 7,261,912 B2 | 8/2007 | Zeigler | |
| 7,282,189 B2 * | 10/2007 | Zauderer | 423/220 |
| 7,285,166 B2 | 10/2007 | Luke et al. | |
| 7,347,896 B2 | 3/2008 | Harrison | |
| 7,427,449 B2 | 9/2008 | Delaney et al. | |
| 7,440,871 B2 | 10/2008 | McConnell et al. | |

| | | |
|---|---|---|
| 7,452,449 B2 | 11/2008 | Weinberg et al. |
| 7,595,001 B2 * | 9/2009 | Arakel et al. ............... 210/710 |
| 2001/0022952 A1 | 9/2001 | Rau et al. |
| 2001/0023655 A1 * | 9/2001 | Knopf et al. ............... 106/792 |
| 2001/0054253 A1 | 12/2001 | Takahashi et al. |
| 2002/0009410 A1 | 1/2002 | Mathur |
| 2002/0127474 A1 | 9/2002 | Fleischer et al. |
| 2003/0017088 A1 | 1/2003 | Downs et al. |
| 2003/0123930 A1 | 7/2003 | Jacobs et al. |
| 2003/0126899 A1 | 7/2003 | Wolken |
| 2003/0188668 A1 | 10/2003 | Bland |
| 2003/0213937 A1 * | 11/2003 | Yaniv ....................... 252/500 |
| 2004/0014845 A1 * | 1/2004 | Takamura et al. ............. 524/59 |
| 2004/0040671 A1 | 3/2004 | Duesel, Jr. et al. |
| 2004/0040715 A1 | 3/2004 | Wellington et al. |
| 2004/0052865 A1 | 3/2004 | Gower et al. |
| 2004/0126293 A1 | 7/2004 | Geerlings et al. |
| 2004/0139891 A1 * | 7/2004 | Merkley et al. ............. 106/805 |
| 2004/0213705 A1 | 10/2004 | Blencoe et al. |
| 2004/0219090 A1 | 11/2004 | Dziedzic et al. |
| 2004/0228788 A1 | 11/2004 | Nagai et al. |
| 2004/0231568 A1 | 11/2004 | Morioka et al. |
| 2004/0234443 A1 * | 11/2004 | Chen et al. ................. 423/432 |
| 2004/0259231 A1 | 12/2004 | Bhattacharya |
| 2004/0267077 A1 | 12/2004 | Ding et al. |
| 2005/0002847 A1 | 1/2005 | Maroto-Valer et al. |
| 2005/0011770 A1 | 1/2005 | Katsuyoshi et al. |
| 2005/0022847 A1 | 2/2005 | Nito et al. |
| 2005/0031522 A1 | 2/2005 | Delaney et al. |
| 2005/0036932 A1 | 2/2005 | Takahashi et al. |
| 2005/0087496 A1 | 4/2005 | Borseth |
| 2005/0118081 A1 | 6/2005 | Harris et al. |
| 2005/0129606 A1 | 6/2005 | Mitsuhashi et al. |
| 2005/0154669 A1 | 7/2005 | Streetman |
| 2005/0180910 A1 | 8/2005 | Park et al. |
| 2005/0232855 A1 * | 10/2005 | Stevens et al. ............. 423/650 |
| 2005/0238563 A1 | 10/2005 | Eighmy et al. |
| 2005/0255174 A1 | 11/2005 | Shelley et al. |
| 2006/0048517 A1 | 3/2006 | Fradette et al. |
| 2006/0051274 A1 | 3/2006 | Wright et al. |
| 2006/0060532 A1 | 3/2006 | Davis |
| 2006/0105082 A1 | 5/2006 | Zeigler |
| 2006/0165583 A1 | 7/2006 | Makino et al. |
| 2006/0169177 A1 * | 8/2006 | Jardine et al. ............... 106/638 |
| 2006/0184445 A1 | 8/2006 | Sandor et al. |
| 2006/0185516 A1 | 8/2006 | Moriyama et al. |
| 2006/0185560 A1 | 8/2006 | Ramme et al. |
| 2006/0185985 A1 | 8/2006 | Jones |
| 2006/0195002 A1 | 8/2006 | Grandjean et al. |
| 2006/0196836 A1 | 9/2006 | Arakel et al. |
| 2006/0288912 A1 | 12/2006 | Sun et al. |
| 2007/0056487 A1 | 3/2007 | Anthony et al. |
| 2007/0092427 A1 | 4/2007 | Anthony et al. |
| 2007/0148509 A1 | 6/2007 | Colbow et al. |
| 2007/0163443 A1 | 7/2007 | Moriyama et al. |
| 2007/0186820 A1 | 8/2007 | O'Hearn |
| 2007/0187247 A1 | 8/2007 | Lackner et al. |
| 2007/0202032 A1 | 8/2007 | Geerlings et al. |
| 2007/0212584 A1 | 9/2007 | Chuang |
| 2007/0217981 A1 | 9/2007 | Van Essendelft |
| 2007/0240570 A1 | 10/2007 | Jadhav et al. |
| 2007/0261947 A1 | 11/2007 | Geerlings et al. |
| 2008/0031801 A1 | 2/2008 | Lackner et al. |
| 2008/0112868 A1 | 5/2008 | Blencoe et al. |
| 2008/0138265 A1 | 6/2008 | Lackner et al. |
| 2008/0171158 A1 | 7/2008 | Maddan |
| 2008/0223727 A1 | 9/2008 | Oloman et al. |
| 2008/0236143 A1 | 10/2008 | Lo |
| 2008/0245274 A1 | 10/2008 | Ramme |
| 2008/0245660 A1 | 10/2008 | Little et al. |
| 2008/0245672 A1 | 10/2008 | Little et al. |
| 2008/0248350 A1 | 10/2008 | Little et al. |
| 2008/0275149 A1 | 11/2008 | Ladely et al. |
| 2008/0277319 A1 | 11/2008 | Wystra |
| 2008/0289495 A1 | 11/2008 | Eisenberger et al. |
| 2009/0001020 A1 | 1/2009 | Constantz et al. |
| 2009/0010827 A1 | 1/2009 | Geerlings et al. |
| 2009/0081093 A1 | 3/2009 | Comrie |
| 2009/0081096 A1 | 3/2009 | Pellegrin |
| 2009/0090277 A1 | 4/2009 | Joshi et al. |
| 2009/0169452 A1 | 7/2009 | Constantz et al. |
| 2009/0186244 A1 | 7/2009 | Mayer |
| 2009/0232861 A1 | 9/2009 | Wright et al. |
| 2009/0301352 A1 | 12/2009 | Constantz et al. |
| 2010/0024686 A1 | 2/2010 | Constantz et al. |

FOREIGN PATENT DOCUMENTS

| | | |
|---|---|---|
| CA | 1335974 A1 | 6/1995 |
| CA | 2646462 | 9/2007 |
| DE | 2653649 A1 | 6/1978 |
| DE | 3146326 A1 | 6/1983 |
| DE | 3638317 | 1/1986 |
| DE | 19523324 A1 | 9/1994 |
| DE | 19631794 A1 | 8/1997 |
| EP | 0522382 A1 | 1/1993 |
| EP | 0487102 B1 | 8/1995 |
| EP | 0591350 B1 | 11/1996 |
| EP | 0628339 B1 | 9/1999 |
| EP | 0844905 B1 | 3/2000 |
| EP | 1379469 | 3/2006 |
| EP | 1650162 A1 | 4/2006 |
| EP | 1716911 A1 | 11/2006 |
| EP | 1554031 | 12/2006 |
| EP | 1571105 B1 | 12/2007 |
| GB | 911386 A | 11/1962 |
| GB | 2032441 | 5/1980 |
| GB | 2371810 | 11/2009 |
| JP | 51102357 A1 | 9/1976 |
| JP | 59100280 | 12/1982 |
| JP | 1142093 | 11/1987 |
| JP | 63-312988 | 12/1988 |
| JP | 03-020491 | 1/1991 |
| JP | 7061842 A | 3/1995 |
| JP | 2003041388 | 7/2001 |
| WO | WO 1993/16216 A1 | 8/1993 |
| WO | WO 1996/34997 A1 | 11/1996 |
| WO | WO 99/13967 A1 | 3/1999 |
| WO | WO 1999/13967 A1 | 3/1999 |
| WO | WO 01/07365 A1 | 2/2001 |
| WO | WO 01/96243 A1 | 12/2001 |
| WO | WO 02/00551 A2 | 1/2002 |
| WO | WO 03/008071 A1 | 1/2003 |
| WO | WO 03/054508 A2 | 7/2003 |
| WO | WO 03/068685 A1 | 8/2003 |
| WO | WO 2004/041731 A1 | 5/2004 |
| WO | WO 2004/094043 A2 | 11/2004 |
| WO | WO 2004/098740 A2 | 11/2004 |
| WO | WO 2005/078836 A2 | 8/2005 |
| WO | 2005086843 | 9/2005 |
| WO | WO 2005/108297 A2 | 11/2005 |
| WO | WO 2006/009600 A2 | 1/2006 |
| WO | WO 2006/034339 A1 | 3/2006 |
| WO | WO 2006/036396 A2 | 4/2006 |
| WO | WO 2006/134080 A1 | 12/2006 |
| WO | 2007003013 | 1/2007 |
| WO | 2007016271 | 2/2007 |
| WO | WO 2007/060149 A1 | 5/2007 |
| WO | WO 2007/071633 A1 | 6/2007 |
| WO | WO 2007/094691 A1 | 8/2007 |
| WO | WO 2007/096671 A1 | 8/2007 |
| WO | 2007106372 | 9/2007 |
| WO | WO 2007/106883 A2 | 9/2007 |
| WO | WO 2007/123917 A2 | 11/2007 |
| WO | WO 2007/139392 A1 | 12/2007 |
| WO | WO 2007/140544 A1 | 12/2007 |

| | | |
|---|---|---|
| WO | 2008018928 | 2/2008 |
| WO | 2008026201 | 3/2008 |
| WO | WO 2008/031834 A1 | 3/2008 |
| WO | 2008061305 | 5/2008 |
| WO | WO 2008/068322 A1 | 6/2008 |
| WO | 2008089523 | 7/2008 |
| WO | WO 2008/095057 A2 | 8/2008 |
| WO | WO 2008/101293 A1 | 8/2008 |
| WO | WO 2008/108657 A1 | 9/2008 |
| WO | WO 2008/115662 A2 | 9/2008 |
| WO | WO 2008/124538 A1 | 10/2008 |
| WO | WO 2008/140821 A2 | 11/2008 |
| WO | WO 2008/142017 A2 | 11/2008 |
| WO | WO 2008/142025 A2 | 11/2008 |
| WO | WO 2008/151060 A1 | 12/2008 |
| WO | WO 2009/006295 A2 | 1/2009 |
| WO | WO 2009/024826 A1 | 2/2009 |
| WO | WO 2009/039655 A1 | 4/2009 |
| WO | WO 2009/065031 A1 | 5/2009 |
| WO | WO 2009/070273 A1 | 6/2009 |
| WO | WO 2009/086460 A1 | 7/2009 |
| WO | WO 2009/146436 A1 | 12/2009 |
| WO | WO 2010/006242 A1 | 1/2010 |

OTHER PUBLICATIONS

Aker, "Aker Clean Carbon, Carbon Capture Solutions Provider" Aker Clean Carbon Presentation for UN's IPCC; Jan. 24, 2008; 8pp.
Alexander, G. et al., "Evaluation of reaction variables in the dissolution of serpentine for mineral carbonation"; Elsevier; ScienceDirect Fuel 86 (2007) 273-281.
Berg et al., "A 3-Hydroxyproprionate/ 4-Hydroxybutyrate Autotrophic Carbon Dioxide Assimilation Pathway in Archea"; Science 14, Dec. 2007; vol. 318, No. 5857 DOI 10.1126/science 1149976; pp. 1782-1786.
CICCS "Aims and Research"; www.nottingham.ac.uk/carbonmanagement/ccs_aims.php 2pp Aug. 3, 2007.
Druckenmiller et al., "Carbon sequestration using brine of adjusted pH to form mineral carbonates"; Elsevier; www.elsevier.com/locate/fuproc; Fuel Processing Technology 86 (2005) 1599-1614.
Graff "Just Catch—CO2 Capture Technology" Aker Kvaerner; Pareto Clean Energy Tech Seminar Oct. 11 (2007) 25pp.
Goldberg et al., "CO2 Mineral Sequestration Studies in US"; National Energy Technology Laboratory; goldberg@netl.doe.gov; 10pp.
Green Car Congress "Researcher Proposes System for Capture of Mobile Source CO2 Emissions Directly from Atmosphere"; www.greeencarcongress.com/2007/10/researcher-prop.html#more; Oct. 8, 2007; 4pp.
Green Car Congress "Researchers Develop New Method for Ocean Sequestration of Carbon Dioxide Through Accelerated Weathering f Volcanic Rocks"; www.greeencarcongress.com/2007/11/researchers-dev.html#more; Nov. 7, 2007; 3pp.
Green Car Congress "PKU Researchers Carry Out Aqueous Fischer-Tropsch Reaction for First Time"; www.greeencarcongress.com/2007/12/pku-researchers.html; Dec. 12, 2007; 2pp.
Haywood et al., "Carbon dioxide sequestration as stable carbonate minerals—environmental barriers"; Environmental Geology (2001) 41:11-16; Springer-Verlag 2001.
Hill et al., "Preliminary Investigation of Carbon Sequestration Potential in Brine from Pennsylvania's Oriskany Sandstone Formation in Indiana County, PA"; The Energy Institute and the Department of Energy & Geo-Environmental Engineering; 5pp.
Kohlmann et al., "Carbon Dioxide Emission Control by Mineral Carbonation: The Option for Finland"; INFUB 6th European Conference on Industrial Furnaces and Boilers Estoril Lisbon Portugal, Apr. 2-5, 2002 10pp.
Lackner, K. "Carbonate Chemistry for Sequestering Fossil Carbon"; Annual Review Energy Environ. 2002 27:193-232.
O'Connor et al., "Carbon Dioxide Sequestration by Direct Mineral Carbonation: Results From Recent Studies and Current Status"; Albany Research Center, Albany Oregon; Office of Fossil Energy, US Dept. of Energy; 1st Annual DOE Carbon Sequestration Conference, Washington DC, May 2001 12pp.
Rahardianto et al., "High recovery membrane desalting of low-salinity brackish water: Integration of accelerated precipitation softening with membrane RO"; Science Direct; Journal of Membrane Science 289 (2007) 123-137.
Raz et al., "Formation of High-Magnesium Calcites via an Amorphous Precursor Phase: Possible Biological Implications"; Advanced Materials; Adv. Mater. (2000) vol. 12, No. 1; 5pp.
Sadhwani et al., "Case Studies on environmental impact of seawater desalination" Science Direct; http://www.sciencedirect.com/science?_ob=ArticleURL&_udi=B6TFX-4HMX97J-38&_u... 3pp.
Serizawa et al., "Cell-compatible properties of calcium carbonates and hydroxyapatite deposited on ultrathin poly (vinyl alcohol)-coated polyethylene films"; J. Biomater Sci. Polymer Edn., vol. 14, No. 7 (2003) pp. 653-663.
Shell Global Solutions, "ADIP-X and Sulfinol-X—new regenerable acid-gas removal processes"; Shell Global Solutions International; OG 130210370903-En(A); www.shellglobalsoultions.com 2 pp.
"Electrochemical cell", Wikipedia (2009), http:en.wikipedia.org/wiki/Electrochemical_Cell, Nov. 24, 2009, 5 pp.
International Search Report dated Dec. 14, 2009 of PCT/US09/061748.
Biello, D. Cement from CO2: A Concrete Cure for Global Warming? *Scientific American* Aug. 7, 2008., pp. 1-3 [online] [retrieved on Dec. 29, 2009] <URL: http://www.scientificamerican.com/article.cfm>.
Carbon Sequestration. National Energy Technology Laboratory, Jul. 1, 2008 (online) [retrieved on Dec. 21, 2009] <URL: http://web.archive.org/web/20080701213124/http://www.netl.doe.gov/technologies/carbon_seq/index.html>.
Christiansen, L.E., et al. Measurement of Sulfur Isotope Compositions by Tunable Laser Spectroscopy of SO2. Analytical Chemistry, Nov. 17, 2007, vol. 79, No. 24, pp. 9261-9268 (abstract) [online] [retrieved on Dec. 30, 2009] <URL: http://pubs.acs.org/doi/abs/10.1021/ac071040p>.
Huijgen, W.J.J., et al. 2005. Mineral CO2 Sequestration by Steel Slag Carbonation. *Environ. Sci. Technol.* 39: 9676-9682.
Huijgen, W.J.J., et al. 2006. Energy Consumption and Net CO2 Sequestration of Aqueous Mineral Carbonation. *Ind. Eng. Chem. Res.* 45: 9184-9194.
Huntzinger, D.N. et al. 2009. A life-cycle assessment of Portland cement manufacturing: comparing the traditional process with alternative technologies. *Journal of Cleaner Production.* 17: 668-675.
Huntzinger, D.N. Carbon Dioxide Sequestration in Cement Kiln Dust Through Mineral Carbonation. Michigan Technological University, 2006 [online], [retrieved on Dec. 29, 2009]. <URL: http://www.geo.mtu.edu/~dnhuntzi/DNHuntzingerETD.pdf>.
International Search Report dated Jan. 4, 2010 of PCT/US09/062795.
International Search Report dated Jan. 13, 2010 of PCT/US09/059135.
International Search Report dated Feb. 2, 2010 of PCT/US09/059141.
Lin, C. et al. Use of Cement Kiln Dust, Fly Ash, and Recycling Technique in Low-Volume Road Rehabilitation. Transportation Research Record, 1992, No. 1345, pp. 19-27 (abstract) [online], [retrieved on Dec. 31, 2009] <URL: http://pubsindex.trb.org/view.aspx?id=370714>.
Sasakawa, M., et al. Carbonic Isotopic Characterization for the Origin of Excess Methane in Subsurface Seawater. Journal of Geophysical Research, vol. 113 (abstract) [online], Mar. 11, 2008 [retrieved on Jan. 1, 2010] <URL: http://www.agu.org/pubs/crossref/2008/2007JC004217.shtml>.
Stanley, S.M., et al. 2002. Low-magnesium calcite produced by corallin algae in seawater of Late Cretaceous composition. *PNAS.* 99(24): 15323-15326.
U.S. Appl. No. 12/344,019 filed Dec. 24, 2008, Constantz, Brent R., et al, Non-Final Office Action dated Nov. 16, 2009.
Wang, W., et al. 2005. Effects of biodegradation on the carbon isotopic composition of natural gas—A case study in the bamianhe oil field of the Jiyang Depression, Eastern China. *Geochemical Journal.*

39(4): 301-309. (abstract) [online] [retrieved on Dec. 29, 2009] <URL: http://www/jstage.jst.go.jp/article/geochemj/39/4/39_301/_article> ab.

Winschel, R.A., et al. Stable Carbon Isotope Analysis of Coal/Petroleum Coprocessing Products. Preprints of Papers, American Chemical Society, Division of Fuel Chemistry, Jan. 1, 1988, vol. 33, No. 1, pp. 114-121 [online], [retrieved on Dec. 29, 2009] <URL: http://www.anl.gov/PCS/acsfuel/preprint%20archive/Files/33_1_Toronto_06-88_0114.PDF>.

U.S. Appl. No. 12/126,776 filed May 23, 2008, Constantz, Brent R., et al, Non-Final Office Action dated Feb. 25, 2010; 21 pp.

U.S. Appl. No. 12/475,378 filed May 29, 2009, Constantz Brent. et al, Non-Final Office Action dated Mar. 2, 2010.

U.S. Appl. No. 12/486,692 filed Jun. 17, 2009, Constantz Brent. et al, Non-Final Office Action dated Mar. 1, 2010.

Wen-Zhi et al., Using Electrolytic Method to Promote CO2 Sequestration in Serpentine by Mineral Carbonation; Journal of China University of Mining and Technology; vol. 36, No. 6; Nov. 2007 (Publication and English Translation).

Back, M. et al.,"Reactivity of Alkaline Lignite Fly Ashes Towards CO in Water." Environmental Science & Technology. vol. 42, No. 12 (2008) pp. 4520-4526.

Berg et al., "A 3-Hydroxyproprionate/ 4-Hydroxybutyrate Autotrophic Carbon Dioxide Assimilation Pathway in Archea"; Science 14, Dec. 2007; vol. 318, No. 5857 DOI 10.1126/science 1149976; pp. 1782-1786.

"Biomass Burning: A Hot Issue in Global Change." National Aeronautics and Space Administration. Langley Research Center, Hampton, Virginia. Fact Sheet Fs-2001-02-56-LaRC. Feb. 2001. 4 pages.

Bond, G.M., et al. 2001. CO2 Capture from Coal-Fired Utility Generation Plant Exhausts, and Sequestration by a Biomimetic Route Based on Enzymatic Catalysis—Current Status (paper presented at the First National Conference on Carbon Sequestration, May 14-17, in Washington D.C., USA; Paper Sa.5.

Bond, G.M., et al. 2002. Brines as possible cation sources for biomimetic carbon dioxide sequestration. *American Geophysical Union* Abstract #U22A-07.

Cannell, M.G.R. 2003. "Carbon sequestration and biomass energy offset: theoretical, potential and achievable capacities globally, in Europe and the UK." Biomass and Bioenergy. 24: 97-116.

Faverjon, F. et al. 2005. Electrochemical study of a hydrogen diffusion anode-membrane assembly for membrane electrolysis. *Electrochimica Acta* 51 (3): 386-394.

Faverjon, F. et al. 2006. Regeneration of hydrochloric acid and sodium hydroxide from purified sodium chloride by membrane electrolysis using a hydrogen diffusion anode-membrane assembly. Journal of Membrane Science 284 (1-2): 323-330.

Gain, E. et al. 2002. Ammonium nitrate wastewater treatment by coupled membrane electrolysis and electrodialysis. *Journal of Applied Electrochemistry* 32: 969-975.

Genders, D. 1995. Electrochemical Salt Splitting. http://www.electrosynthesis.com/news/mwatts.html (accessed Feb. 5, 2009).

Holze, S. et al. 1994. Hydrogen Consuming Anodes for Energy Saving in Sodium Sulphate Electrolysis. *Chem. Eng. Technol.* 17: 382-389.

Huijgen, W.J.J., et al. 2003. Carbon dioxide sequestration by mineral carbonation. ECN-C-03-016; Energy Research Centre of the Netherlands: Petten; pp. 1-42.

Huijgen, W.J.J., et al. 2005. Carbon dioxide sequestration by mineral carbonation: Literature review update 2003-2004, ECN-C-05-022; Energy Research Centre of the Netherlands: Petten; pp. 1-37.

Huntzinger, D.N. et al.,"Carbon Dioxide Sequestration in Cement Kiln Dust through Mineral Carbonation"; Environmental Science & Technology, vol. 43, No. 6 (2009) pp. 1986-1992.

International Search Report dated Sep. 17, 2008 of PCT/US2008/068564.

International Search Report dated Feb. 19, 2009 of PCT/US08/88242.

International Search Report dated Mar. 11, 2009 of PCT/US2008/088318.

International Search Report dated Mar. 11, 2009 of PCT/2008/088246.

International Search Report dated Aug. 5, 2009 of PCT/2009/048511.

International Search Report dated Sep. 8, 2009 of PCT/US2009/045722.

International Search Report dated Sep. 17, 2009 of PCT/US2009/050756.

International Search Report dated Sep. 22, 2009 of PCT/US2009/047711.

International Search Report dated Oct. 19, 2009 of PCT/US2009/050223.

International Search Report dated Oct. 30, 2009 of PCT/US09/056573.

Justnes, H. et al. "Pozzolanic, Amorphous Silica Produced from the Mineral Olivine." Proceedings of the Seventh CANMET/ACI International Conference on Fly Ash, Silica Fume, Slag and Natural Pozzolans in Concrete, 2001. SP-199-44. pp. 769-781.

Lackner, K.S. et al. "Carbon Dioxide Disposal in Carbonate Minerals." Energy. 1995. 20(11): 1153-1170.

Levy, D. "Burnt biomass causes short-term global cooling, long-term warming." http://news-service.stanford.edu/news/2004/august4/biomass-84.html. 3 pages.

Mazrou, S., et al. 1997. Sodium hydroxide and hydrochloric acid generation from sodium chloride and rock salt by electro-electrodialysis. *Journal of Applied Electrochemistry* 27: 558-567.

Montes-Hernandez, G. et al.,"Mineral sequestration of CO2 by aqueous carbonation of coal combustion fly-ash." Journal of Hazardous Materials vol. 161 (2009). pp. 1347-1354.

Nayak, V.S. "Nonelectrolytic Production of Caustic Soda and Hydrochloric Acid from Sodium Chloride"; Ind. Eng. Chem. Res. 1996. 35: 3808-3811.

O'Connor, W.K. et al. "Carbon dioxide sequestration: Aqueous mineral carbonation studies using olivine and serpentine." 2001. Albany Research Center, National Energy Technology Laboratory: Mineral Carbonation Workshop, Pittsburgh, PA.

Park, a., et al. 2004. CO2 mineral sequestration: physically activated dissolution of serpentine and pH swing process. *Chemical Engineering Science* 59 (22-23): 5241-5247.

Rakib, M. et al. 1999. Behaviour of Nafion® 350 membrane in sodium sulfate electrochemical splitting: continuous process modelling and pilot scale tests. Journal of Applied Electrochemistry. 29: 1439-1448.

Rau, G. 2004. Possible use of Fe/CO2 fuel cells for CO2 mitigation plus H2 and electricity production. *Energy Conversion and Management*. 45: 2143-2152.

Rosenthal, E., "Cement Industry is at Center of Climate Change Debate" New York Times; www.nytimes.com/2007/10/26/business/worldbusiness/26cement.html"ref=todayspaper; 4pp.

Tececo Pty Ltd, "Eco-Cement"; www.tececo.com/simple.eco-cement.php; Dec. 29, 2008; 6pp.

Turner, J.A. 1999. "A Realizable Renewable Energy Future." Science. 285 (5428): 687-689.

Uibu, M. et al. "CO2 mineral sequestration in oil-shale wastes from Estonian power production." Journal of Environmental Management vol. 90 (2009). pp. 1253-1260.

Uibu, M. et al.,"Mineral trapping of CO2 via oil shale ash aqueous carbonation: controlling mechanism of process rate and development of continuous-flow reactor system." Oil Shale. vol. 26, No. 1 (2009)pp. 40-58.

Uliasz-Bochenczyk, A. et al. "Utilization of Carbon Dioxide in Fly Ash and Water Mixtures." Chemical Engineering Research and Design. 2006. 84(A9): 843-846.

U.S. Appl. No. 12/375,632 filed Mar. 5, 2009, Kirk, Donald W. et al, Non-Final Office Action dated Sep. 8, 2009.

Wright, L.L., et al. 1993. "U.S. Carbon Offset Potential Using Biomass Energy Systems." Water, Air, and Soil Pollution. 70:483-497.

* cited by examiner

DESALINATION METHODS AND SYSTEMS THAT INCLUDE CARBONATE COMPOUND PRECIPITATION

CROSS-REFERENCE TO RELATED APPLICATIONS

Pursuant to 35 U.S.C. §119 (e), this application claims priority to the filing dates of: U.S. Provisional Patent Application Ser. No. 61/073,326 filed on Jun. 17, 2008; U.S. Provisional Patent Application Ser. No. 60/937,786 filed on Jun. 28, 2007 and U.S. Provisional Patent Application Ser. No. 61/017,392 filed on Dec. 28, 2007; the disclosures of which applications are herein incorporated by reference.

INTRODUCTION

Desalination systems are desirable in many arid regions and in marine applications where fresh water supplies are limited but large amounts of seawater, inland waterways, rivers, or other sources of salt containing water are available. Fresh water is also needed in large scale for many commercial processes, including agriculture, and electric power generation.

Most conventional desalination systems utilize reverse osmosis or distillation processes. Both of these processes typically result in recovery ratios of approximately 50%. Thus for every gallon of water taken in as feed ½ of a gallon will become purified product water and the other ½ gallon will be discharged with a brine content approximately double in concentration of the feed water's concentration. Discharge of this concentrated brine to the environment can produce localized negative impacts. Conventional desalination systems can produce a brine byproduct that is high in salts and toxic to most organisms. Disposal of the waste brine is potentially hazardous to the environment.

In addition, components of desalination feed waters can adversely impact the efficiency and/or useful life of desalination systems and components therefore. For example, in reverse osmosis systems, the presence of divalent cations in the feed water can cause membrane fouling or scaling, which limits the useful life of the membranes.

SUMMARY

Desalination methods that include carbonate compound precipitation are provided. In certain embodiments, feed water is subjected to carbonate compound precipitation conditions prior to desalination. In certain embodiments, desalination waste brine is subjected to carbonate compound precipitation conditions. In yet other embodiments, both feed water and waste brine are subjected to carbonate compound precipitation conditions. Aspects of the invention include carbon dioxide sequestration. Embodiments of the invention further employ a precipitate product of the carbonate compound precipitation conditions as a building material, e.g., a cement. Also provided are systems configured for use in methods of the invention.

DETAILED DESCRIPTION

Desalination methods that include carbonate compound precipitation are provided. In certain embodiments, feed water is subjected to carbonate compound precipitation conditions prior to desalination. In certain embodiments, desalination waste brine is subjected to carbonate compound precipitation conditions. In yet other embodiments, both feed water and waste brine are subjected to carbonate compound precipitation conditions. Aspects of the invention include carbon dioxide sequestration. Embodiments of the invention further employ a precipitate product of the carbonate compound precipitation conditions as a building material, e.g., a cement. Also provided are systems configured for use in methods of the invention.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

Methods

As summarized above, aspects of the invention include desalination method, where an aspect of the methods is that a carbonate compound precipitation process is performed at one or more times during the overall desalination protocol, e.g., where the feed water and/or waste brine is subjected to carbonate compound precipitation conditions. Embodiments of the methods include: (a) subjecting a feed water to carbonate compound precipitation conditions one or more times to produce a carbonate compound precipitate and an alkali-earth-metal-ion-depleted water; and (b) desalinating the alkali-earth-metal-ion-depleted water to produce a product water. Embodiments of the methods include: a) desalinating salt water to produce desalinated water and waste brine; b) subjecting the waste brine to mineral precipitation conditions to produce a precipitated mineral composition and depleted (i.e., treated) brine; and c) separating the mineral composition from said depleted brine. In certain embodiments, these steps may involve several sequential processes of step a-c, resulting in near zero, or discharge following the processing. In certain of the above embodiments, the methods include charging the water with carbon dioxide from an exogenous source, such as the flue gases from and electrical power plant, to increase the efficiency and yield of the process.

The salt water that is desalinated in embodiments of the invention may be from any convenient saltwater source. The term "saltwater" is employed in its conventional sense to refer a number of different types of aqueous fluids other than fresh water, where the term "saltwater" includes brackish water, sea water and brine (including man-made brines, e.g., geothermal plant wastewaters, etc), as well as other salines having a salinity that is greater than that of freshwater. Brine is water saturated or nearly saturated with salt and has a salinity that is 50 ppt (parts per thousand) or greater. Brackish water is water that is saltier than fresh water, but not as salty as seawater, having a salinity ranging from 0.5 to 35 ppt. Seawater is water from a sea or ocean and has a salinity ranging from 35 to 50 ppt. The saltwater source from which the saltwater feedwater is obtained may be a naturally occurring source, such as a sea, ocean, lake, swamp, estuary, lagoon, etc., or a man-made source. In certain embodiments, the saltwater source is an ocean or sea and the saltwater feedwater is seawater. Saltwaters of interest are ones which contain one or more alkaline earth metals, e.g., magnesium, calcium, etc, such that they may be viewed as alkaline-earth-metal-containing waters. Examples of such waters are those that include calcium in amounts ranging from 50 ppm to 20,000 ppm, such as 200 ppm to 5000 ppm and including 400 ppm to 1000 ppm. Waters of interest include those that include magnesium in amounts ranging from 50 ppm to 40,000 ppm, such as 100 ppm to 10,000 ppm and including 500 ppm to 2500 ppm.

Any convenient protocol may be employed in desalinating saltwater. Desalination (i.e., desalinization or desalinization) refers to any of several processes that remove excess salt and other minerals from water. In desalination, water is desalinated in order to be converted to fresh water suitable for animal consumption or irrigation, or, if almost all of the salt is removed, for human consumption. Desalination methods of interest include, but are not limited to: distillation methods, e.g., Multi-stage flash distillation (MSF), Multiple-effect evaporator (MED|ME), Vapor-compression evaporation (VC) and Evaporation/condensation; Ion exchange methods; Membrane processes, e.g., Electrodialysis reversal (EDR), Reverse osmosis (RO), Nanofiltration (NF), Forward osmosis (FO), Membrane distillation (MD); etc.

As summarized above, at some point during the overall desalination process, e.g., before and/or after desalination, a carbonate compound precipitation step is performed, such that a water is subjected to carbonate compound precipitation conditions. As such, a feedwater and/or waste brine of the desalination process is subjected carbonate compound precipitation conditions. Carbonate precipitation conditions of interest include contacting a water of interest, e.g., feedwater and/or waste brine, with $CO_2$ to produce a $CO_2$ charged water and then subjecting the $CO_2$ charged water to carbonate compound precipitation conditions.

Contact of the water with the source $CO_2$ may occur before and/or during the time when the water is subject to $CO_2$ precipitation conditions, e.g., as described in greater detail below. Accordingly, embodiments of the invention include methods in which the volume of water is contacted with a source of $CO_2$ prior to subjecting the volume of water to precipitation conditions. Embodiments of the invention include methods in which the volume of water is contacted with a source of $CO_2$ while the volume of water is being subjected to carbonate compound precipitation conditions. Embodiments of the invention include methods in which the volume of water is contacted with a source of a $CO_2$ both prior to subjecting the volume of water to carbonate compound precipitation conditions and while the volume of water is being subjected to carbonate compound precipitation conditions.

The source of $CO_2$ that is contacted with the volume of water in these embodiments may be any convenient $CO_2$ source. The $CO_2$ source may be a liquid, solid (e.g., dry ice) or gaseous $CO_2$ source. In certain embodiments, the $CO_2$ source is a gaseous $CO_2$ source. This gaseous $CO_2$ may vary widely, ranging from air, industrial waste streams, etc. This gaseous $CO_2$ is, in certain instances, a waste product from an industrial plant. The nature of the industrial plant may vary in these embodiments, where industrial plants of interest include power plants, chemical processing plants, and other industrial plants that produce $CO_2$ as a byproduct. By waste stream is meant a stream of gas (or analogous stream) that is produced as a byproduct of an active process of the industrial plant, e.g., an exhaust gas. The gaseous stream may be substantially pure $CO_2$ or a multi-component gaseous stream that includes $CO_2$ and one or more additional gases. Multi-component gaseous streams (containing $CO_2$) that may be employed as a $CO_2$ source in embodiments of the subject methods include both reducing, e.g., syngas, shifted syngas, natural gas, and hydrogen and the like, and oxidizing condition streams, e.g., flue gases from combustion. Particular multi-component gaseous streams of interest that may be treated according to the subject invention include: oxygen containing combustion power plant flue gas, turbo charged boiler product gas, coal gasification product gas, shifted coal gasification product gas, anaerobic digester product gas, wellhead natural gas stream, reformed natural gas or methane hydrates, and the like.

In embodiments of the invention, the $CO_2$ source may be flue gas from coal or other fuel combustion, which is contacted with the volume of saltwater with little or no pretreatment of the flue gas. In these embodiments, the magnesium and calcium ions in the alkali-earth-metal-containing water react to form $CaSO_4$ and $MgSO_4$ and other compounds, as well as $CaCO_3$ and $MgCO_3$ and other compounds, effectively removing sulfur from the flue gas stream without additional release of $CO_2$ from the desulfurization step. In certain embodiments, the desulfurization step may be staged to coincide with the carbonate compound precipitation step, or may be staged to occur before this step. In certain embodiments therefore there are multiple sets of reaction products collected at different stages, while in other embodiments there is a single reaction product collected.

In addition to magnesium and calcium containing products of the precipitation reaction, compounds of interest include those based on silicon, aluminum, iron, boron and other elements. Chemical composition and morphology of the products resulting from use of these reactants may alter reactivity of cements resulting from the process, or change the nature of the properties of cured cements and concretes made from them. In embodiments of the invention, ash (as described in greater detail below) is added to the reaction as one source of these additional reactants, to produce carbonate mineral precipitates which contain one or more components such as amorphous silica, crystalline silica, calcium silicates, calcium alumina silicates, or any other moiety which may result from the reaction of ash in the carbonate mineral precipitation process.

The volume of water may be contacted with the $CO_2$ source using any convenient protocol. Where the $CO_2$ is a gas, contact protocols of interest include, but are not limited to: direct contacting protocols, e.g., bubbling the gas through the volume of saltwater, concurrent contacting means, i.e., contact between unidirectionally flowing gaseous and liquid phase streams, countercurrent means, i.e., contact between oppositely flowing gaseous and liquid phase streams, and the like. Thus, contact may be accomplished through use of infusers, bubblers, fluidic Venturi reactor, sparger, gas filter, spray, tray, or packed column reactors, and the like, as may be convenient.

In methods of the invention, a volume of $CO_2$ charged water, e.g., produced as described above, is subjected to carbonate compound precipitation conditions sufficient to produce a precipitated carbonate compound composition and an alkaline-earth metal depleted water, which in the context of the precipitation step may be viewed as the mother liquor (i.e., the part of the water that is left over after precipitation of the carbonate compound composition from the water). Any convenient precipitation conditions may be employed, which conditions result in the production of a carbonate-containing solid or precipitate from the $CO_2$ charged water.

Precipitation conditions of interest include those that modulate the physical environment of the $CO_2$ charged water to produce the desired precipitate product. For example, the temperature of the $CO_2$ charged may be raised to an amount suitable for precipitation of the desired carbonate compound to occur. In such embodiments, the temperature of the $CO_2$ charged may be raised to a value from 5 to 70° C., such as from 20 to 50° C. and including from 25 to 45° C. As such, while a given set of precipitation conditions may have a temperature ranging from 0 to 100° C., the temperature may be raised in certain embodiments to produce the desired precipitate. In certain embodiments, the temperature is raised using energy generated from low or zero carbon dioxide emission sources, e.g., solar energy source, wind energy source, hydroelectric energy source, etc. In certain embodiments the temperature may be raised utilizing heat from flue gases from coal or other fuel combustion.

Aspects of the invention include raising the pH of the $CO_2$ charged water to alkaline levels for precipitation. The pH may be raised to 9 or higher, such as 10 or higher, e.g., 11 or higher.

In embodiments of the invention, ash is employed as a pH modifying agent, e.g., to increase the pH of the $CO_2$ charged water. The ash may be used as a as the sole pH modifier or in conjunction with one or more additional pH modifiers.

Of interest in certain embodiments is use of a coal ash as the ash. The coal ash as employed in this invention refers to the residue produced in power plant boilers or coal burning furnaces, for example, chain grate boilers, cyclone boilers and fluidized bed boilers, from burning pulverized anthracite, lignite, bituminous or sub-bituminous coal. Such coal ash includes fly ash which is the finely divided coal ash carried from the furnace by exhaust or flue gases; and bottom ash which collects at the base of the furnace as agglomerates. Use of ashes as an alkaline source is further described in U.S. Provisional Application 61/073,319 filed on Jun. 17, 2008, the disclosure of which is herein incorporated by reference.

In embodiments of the invention, slag is employed as a pH modifying agent, e.g., to increase the pH of the $CO_2$ charged water. The slag may be used as a as the sole pH modifier or in conjunction with one or more additional pH modifiers. Slag is generated from the processing of metals, and may contain calcium and magnesium oxides as well as iron, silicon and aluminum compounds. The use of slag as a pH modifying material may provide additional benefits via the introduction of reactive silicon and alumina to the precipitated product. Slags of interest include, but are not limited to, blast furnace slag from iron smelting, slag from electric-arc or blast furnace processing of steel, copper slag, nickel slag and phosphorus slag.

In certain embodiments, a pH raising agent may be employed, where examples of such agents include oxides, hydroxides (e.g., calcium oxide, potassium hydroxide, sodium hydroxide, brucite ($Mg(OH)_2$), etc.), carbonates (e.g., sodium carbonate), serpentine, chrysotile, and the like. The addition of serpentine, also releases silica and magnesium into the solution, leading to the formation of silica containing carbonate compounds. The amount of pH elevating agent that is added to the water will depend on the particular nature of the agent and the volume of water being modified, and will be sufficient to raise the pH of the water to the desired value. Alternatively, the pH of the water can be raised to the desired level by electrolysis of the water. Where electrolysis is employed, a variety of different protocols may be taken, such as use of the Mercury cell process (also called the Castner-Kellner process); the Diaphragm cell process and the membrane cell process. Where desired, byproducts of the hydrolysis product, e.g., $H_2$, sodium metal, etc. may be harvested and employed for other purposes, as desired. In certain embodiments, the pH level of the carbonate precipitation supernatant is increased via electrolysis and then returned to the reaction vessel along with seawater or desalination brine to participate in further carbonate precipitation. The removal of calcium, magnesium and other cations in these embodiments prior to electrolysis can make using the electrolysis process to raise the solution pH more efficient Additives other than pH elevating agents may also be introduced into the water in order to influence the nature of the precipitate that is produced. As such, certain embodiments of the methods include providing an additive in water before or during the time when the water is subjected to the precipitation conditions. Certain calcium carbonate polymorphs can be favored by trace amounts of certain additives. For example, vaterite, a highly unstable polymorph of $CaCO_3$ which precipitates in a variety of different morphologies and converts rapidly to calcite, can be obtained at very high yields by including trace amounts of lanthanum as lanthanum chloride in a supersaturated solution of calcium carbonate. Other additives beside lanthanum that are of interest include, but are not limited to transition metals and the like. For instance, the addition of ferrous or ferric iron is known to favor the formation of disordered dolomite (protodolomite) where it would not form otherwise.

In certain embodiments, additives are employed which favor the formal of precipitates characterized by larger sized particles, e.g., particles ranging in size from 50 to 1000 µm, such as 100 to 500 µm, and/or of an amorphous nature. In certain embodiments, these additives are transition metal catalysts. Transition metal catalysts of interest include, but are not limited to: soluble compounds of Zn, Cr, Mn, Fe, Co, and Ni or any combination thereof. Specific compounds of interest include, but are not limited to: $CoCl_2$ or $NiCl_2$. The amount of such transition metal catalysts, when employed, may vary, ranging in certain embodiments from 10 ppb to 2000 ppm, such as 100 ppb to 500 ppm. Inclusions of such additives may be employed to provide for amorphous products where otherwise crystalline products are obtained without such additives and/or to obtain larger particle sizes in the precipitate as compared to precipitates produced in the absence of such additives.

The nature of the precipitate can also be influenced by selection of appropriate major ion ratios. Major ion ratios also have considerable influence of polymorph formation. For example, as the magnesium:calcium ratio in the water increases, aragonite becomes the favored polymorph of calcium carbonate over low-magnesium calcite. At low magnesium:calcium ratios, low-magnesium calcite is the preferred polymorph.

Rate of precipitation can also be modulated to control the nature of the compound phase formation. The most rapid precipitation can be achieved by seeding the solution with a desired phase. Without seeding, rapid precipitation can be achieved by rapidly increasing the pH of the sea water, which results in more amorphous constituents. When silica is present, the more rapid the reaction rate, the more silica is incorporated with the carbonate precipitate. The higher the pH is, the more rapid the precipitation is and the more amorphous the precipitate is. In certain embodiments, the rate of precipitation is chosen to produce large aragonite crystals of higher purity, e.g., crystals of agglomerated structures ranging from 20 to 50 µm, made up of individual structures ranging from 10 to 15 µm, e.g., as described in Example II, below.

Accordingly, a set of precipitation conditions to produce a desired precipitate from a water include, in certain embodiments, the water's temperature and pH, and in some instances the concentrations of additives and ionic species in the water. Precipitation conditions may also include factors such as mixing rate, forms of agitation such as ultrasonics, and the presence of seed crystals, catalysts, membranes, or substrates. In some embodiments, precipitation conditions include supersaturated conditions, temperature, pH, and/or concentration gradients, or cycling or changing any of these parameters. The protocols employed to prepare carbonate compound precipitates according to the invention may be batch or continuous protocols. It will be appreciated that precipitation conditions may be different to produce a given precipitate in a continuous flow system compared to a batch system.

Following production of the carbonate compound precipitate from the water, the resultant precipitated carbonate compound composition is separated from the mother liquor to produce a product water, e.g., alkaline-earth-metal-depleted water that can be used for feedwater for desalination or treated brine. Separation of the precipitate from the product water can be achieved using any convenient approach, including a mechanical approach, e.g., where bulk excess water is drained from the precipitate, e.g., either by gravity alone or with the addition of vacuum, mechanical pressing, by filtering the precipitate from the mother liquor to produce a filtrate, etc. Separation of bulk water produces a wet, dewatered precipitate.

In certain filtration embodiments, the size of the precipitate particles are controlled to provide for efficient and non-energy intensive filtration, e.g., where precipitated particles are produced having a size ranging from 50 to 1000 µm, such as 100 to 500 µm. As such, in some embodiments of the current invention, the size and composition of the precipitated material is controlled to reduce or eliminate the need for high energy mechanical filtration of the feedstock prior to reverse osmosis.

With the use of certain transition metal catalysts in carbonate and carbonate/silicate precipitation processes, it is possible to attain amorphous precipitates where crystalline structures are typically observed. The transition metal catalysts that can be used comprise soluble compounds of Zn, Cr, Mn, Fe, Co, and Ni or any combination of. For instance, $CoCl_2$ or $NiCl_2$ added at concentration anywhere from 10 ppb to 2000 ppm, including 100 ppb to 500 ppm, will result in the precipitation of an amorphous structure where a completely crystalline structure would typically be observed.

The rate of formation of the precipitate is enhanced by the use of these catalysts, resulting in a larger particle size, a more amorphous structure, or a combination thereof. In those embodiments producing larger particle sizes, the removal of the precipitate from the feedstock can be accomplished by lower energy means, such as gravity settling.

In contrast with seeding approaches to precipitation, methods of invention do not generate CO2 during the precipitation process. As such, embodiments of methods of the invention may be viewed as $CO_2$-generation-free precipitation protocols.

Figure 1:
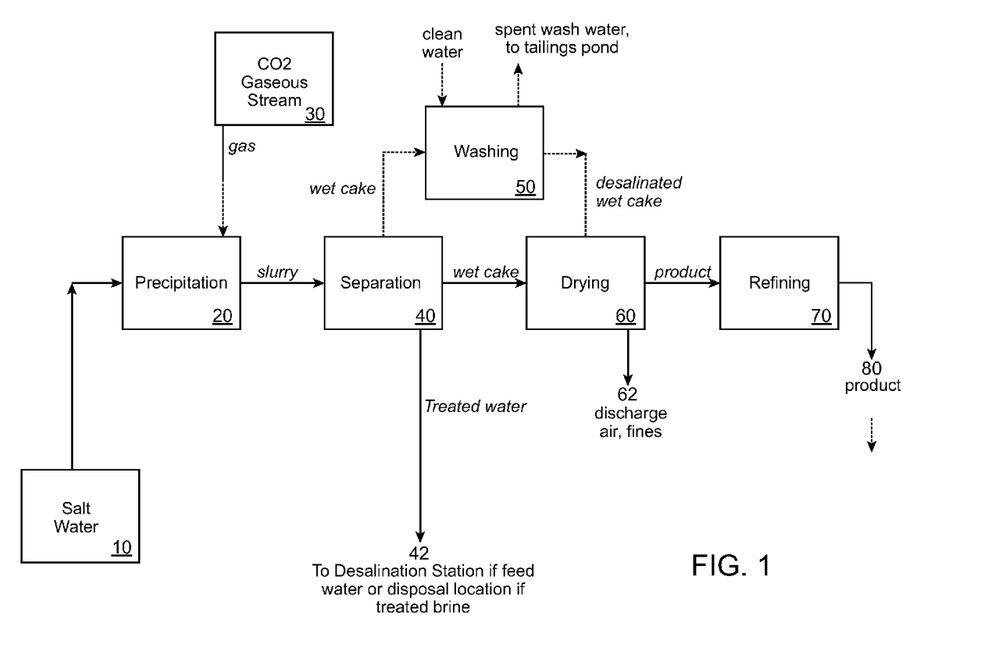
FIG. 1 provides a flow diagram of a precipitation process according to an embodiment of the invention.

FIG. 1 provides a schematic flow diagram of a carbonate precipitation process according to an embodiment of the invention. In FIG. 1, water from a water source 10, which may be feedwater for a desalination plant and/or waste brine from a desalination plant, is subjected to carbonate compound precipitation conditions at precipitation step 20. In the embodiment depicted in FIG. 1, the water from water source 10 is first charged with $CO_2$ to produce $CO_2$ charged water, which $CO_2$ is then subjected to carbonate compound precipitation conditions. As depicted in FIG. 1, a $CO_2$ gaseous stream 30 is contacted with the water at precipitation step 20. The provided gaseous stream 30 is contacted with a suitable water at precipitation step 20 to produce a $CO_2$ charged water, as reviewed above. At precipitation step 20, carbonate compounds, which may be amorphous or crystalline, are precipitated. As reviewed above, $CO_2$ charging and carbonate compound precipitation may occur in a continuous process or at separate steps. As such, charging and precipitation may occur in the same reactor of a system, e.g., as illustrated in FIG. 1 at step 20, according to certain embodiments of the invention. In yet other embodiments of the invention, these two steps may occur in separate reactors, such that the water is first charged with $CO_2$ in a charging reactor and the resultant $CO_2$ charged water is then subjected to precipitation conditions in a separate reactor.

Following production of the carbonate precipitate from the water, the resultant precipitated carbonate compound composition is separated from the alkaline-earth-metal-depleted water, i.e., the mother liquor, to produce separated carbonate compound precipitate product, as illustrated at step 40 of FIG. 1. Separation of the precipitate can be achieved using any convenient approach, including a mechanical approach, e.g., where bulk excess water is drained from the precipitated, e.g., either by gravity alone or with the addition of vacuum, mechanical pressing, by filtering the precipitate from the mother liquor to produce a filtrate, etc. Separation of bulk water (which is to be employed as treated feed water for desalination or treated brine, as described above and indicated as 42) produces a wet, dewatered precipitate.

In the embodiment shown in FIG. 1, the resultant dewatered precipitate is then dried to produce a product, as illustrated at step 60 of FIG. 1. Drying can be achieved by air drying the filtrate. Where the filtrate is air dried, air drying may be at room or elevated temperature. In yet another embodiment, the precipitate is spray dried to dry the precipitate, where the liquid containing the precipitate is dried by feeding it through a hot gas (such as the gaseous waste stream from the power plant), e.g., where the liquid feed is pumped through an atomizer into a main drying chamber and a hot gas is passed as a co-current or counter-current to the atomizer direction. Depending on the particular drying protocol of the system, the drying station may include a filtration element, freeze drying structure, spray drying structure, etc. Where desired, the dewatered precipitate product from the separation reactor 40 may be washed before drying, as illustrated at optional step 50 of FIG. 1. The precipitate may be washed with freshwater, e.g., to remove salts (such as NaCl) from the dewatered precipitate. Used wash water may be disposed of as convenient, e.g., by disposing of it in a tailings pond, etc. In certain embodiments, the resultant product is further processed, e.g., to produce an above ground storage stable carbon sequestration material, to produce a building material, etc., as described in greater detail below. For example, in the embodiment illustrated in FIG. 1, at step 70, the dried precipitate is further processed or refined, e.g., to provide for desired physical characteristics, such as particle size, surface area, etc., or to add one or more components to the precipitate, such as admixtures, aggregate, supplementary cementitious materials, etc., to produce a final product 80.

In certain embodiments, a system is employed to perform the above methods, where such systems include those described below in greater detail.

The product water of the process illustrated in FIG. 1, i.e., the alkaline-earth-metal-depleted water, is either subjected to desalination and/or disposed of in a suitable manner, e.g., depending on whether the input water of the carbonate compound precipitation reaction is feedwater or waste brine, as indicated by element 42.

In those embodiments where input water of the carbonate compound precipitation process is desalination feedwater, the product alkaline-earth-metal-depleted water is then subjected to a desalination process. As reviewed above, any convenient protocol may be employed in desalinating saltwater. Desalination (i.e., desalinization or desalinization) refers to any of several processes that remove excess salt and other minerals from water. In desalination, water is desalinated in order to be converted to fresh water suitable for animal consumption or irrigation, or, if almost all of the salt is removed, for human consumption. Desalination methods of interest include, but are not limited to: distillation methods, e.g., Multi-stage flash distillation (MSF), Multiple-effect evaporator (MED|ME), Vapor-compression evaporation (VC) and Evaporation/condensation; Ion exchange methods; Membrane processes, e.g., Electrodialysis reversal (EDR), Reverse osmosis (RO), Nanofiltration (NF), Forward osmosis (FO), Membrane distillation (MD); etc.

Of interest in certain embodiments are membrane desalination processes, e.g., reverse osmosis. Reverse osmosis (RO) is a separation process that uses pressure to force a feedwater through a membrane(s) that retains a solute(s) on one side and allows water molecules to pass to the other side. As such, it is the process of forcing water molecules from a region of high solute concentration through a membrane to a region of low solute concentration by applying a pressure in excess of the osmotic pressure. Membranes employed in RO processes are semipermeable, such that they allow the passage of water but not of solute(s). The membranes used for reverse osmosis have a dense barrier layer in the polymer matrix where most separation occurs. In certain embodiments, the membrane is designed to allow only water to pass through this dense layer while preventing the passage of solutes (such as salt ions). Embodiments of RO employ a high pressure that is exerted on the high concentration side of the membrane, such as 2-17 bar (30-250 psi) for brackish water, and 40-70 bar (600-1000 psi) for seawater. RO processes and systems with which the present invention may be employed include, but are not limited to, those described in U.S. Pat. Nos. 6,833,073; 6,821,430; 6,709,590; 6,656,362; 6,537,456; 6,368,507; 6,245,234; 6,190,556; 6,187,200; 6,156,680; 6,139,740; 6,132,613; 6,063,278; 6,015,495; 5,925,255; 5,851,355; 5,593,588; 5,425,877; 5,358,640; 5,336,409; 5,256,303; 5,250,185; 5,246,587; 5,173,335; 5,160,619; RE34,058; 5,084,182; 5,019,264; 4,988,444; 4,886,597; 4,772,391; 4,702,842; 4,473,476; 4,452,696; 4,341,629; 4,277,344; 4,259,183; the disclosures of which are herein incorporated by reference.

As summarized above, in certain embodiments the water subjected to carbonate compound precipitation conditions is a waste brine. Desalinating salt water produces desalinated water and waste brine. The desalinated water may be further employed in any convenient manner, e.g., for irrigation, for animal and human consumption, for industrial use, etc.

Waste brine produced by desalination is then processed to produce treated brine. In the subject methods, the waste brine is subjected to carbonate compound precipitation conditions, as described above. In some cases, it may be desirable to remove the chloride and sodium from the initial brine concentrate before the brine is treated to produce depleted brine. For instance, following the initial desalting step where freshwater is produced, and the initial brine concentrate is formed, chlorine, caustic soda, and halite (table salt) may be produced via a chlor-alkali process or the like, before the carbonate and hydroxide minerals are precipitated from the brine. In these cases, a near-zero, or zero discharge depleted brine, of only fresh, or near-fresh water is produced.

Following production of the precipitate from the waste brine, the resultant precipitate is separated from the remaining liquid, which is referred to herein as treated or depleted brine. Separation of the precipitate can be achieved as described above. The resultant treated brine may then be further processed and/or returned to the environment as desired. For example, the treated brine may be returned to the source of the water, e.g., ocean, or to another location. In certain embodiments, the treated brine may be contacted with a source of $CO_2$, e.g., as described above, to sequester further $CO_2$. For example, where the treated brine is to be returned to the ocean, the treated brine may be contacted with a gaseous source of $CO_2$ in a manner sufficient to increase the concentration of carbonate ion present in the treated brine. Contact may be conducted using any convenient protocol, such as those described above. In certain embodiments, the treated brine has an alkaline pH, and contact with the $CO_2$ source is carried out in a manner sufficient to reduce the pH to a range between 5 and 9, e.g., 6 and 8.5, including 7.5 to 8.2.

The resultant treated brine of the reaction may be disposed of using any convenient protocol. In certain embodiments, it may be sent to a tailings pond for disposal. In certain embodiments, it may be disposed of in a naturally occurring body of water, e.g., ocean, sea, lake or river. In certain embodiments, the treated brine is returned to the source of feedwater for the desalination process, e.g., an ocean or sea.

Practice of the methods of the invention results in the production of a carbonate containing precipitate product. As the precipitates are derived from a water source, they will include one or more components that are present in the water source, e.g., sea water, brine, brackish water, and identify the compositions that come from the water source, where these identifying components and the amounts thereof are collectively referred to herein as a water source identifier. For example, if the water source is sea water, identifying compounds that may be present in the carbonate compound compositions include, but are not limited to: chloride, sodium, sulfur, potassium, bromide, silicon, strontium and the like. Any such source-identifying or "marker" elements are generally present in small amounts, e.g., in amounts of 20,000 ppm or less, such as amounts of 2000 ppm or less. In certain embodiments, the "marker" compound is strontium, which may be present in the precipitated incorporated into the aragonite lattice, and make up 10,000 ppm or less, ranging in certain embodiments from 3 to 10,000 ppm, such as from 5 to 5000 ppm, including 5 to 1000 ppm, e.g., 5 to 500 ppm, including 5 to 100 ppm. Another "marker" compound of interest is magnesium, which may be present in amounts of up to 20% mole substitution for calcium in carbonate compounds. The saltwater source identifier of the compositions may vary depending on the particular saltwater source employed to produce the saltwater-derived carbonate composition. In certain embodiments, the calcium carbonate content of the cement is 25% w/w or higher, such as 40% w/w or higher, and including 50% w/w or higher, e.g., 60% w/w. The carbonate compound composition has, in certain embodiments, a calcium/magnesium ratio that is influenced by, and therefore reflects, the water source from which it has been precipitated. In certain embodiments, the calcium/magnesium molar ratio ranges from 10/1 to 1/5 Ca/Mg, such as 5/1 to 1/3 Ca/Mg. In certain embodiments, the carbonate composition is characterized by having an water source identifying carbonate to hydroxide compound ratio, where in certain embodiments this ratio ranges from 100 to 1, such as 10 to 1 and including 1 to 1.

In certain embodiments, the product precipitate may include one or more boron containing compounds. Boron containing compounds that may be present include, but are not limited to: boric acid; borates and borate polymers, e.g., Borax (i.e., sodium borate, sodium tetraborate, or disodium tetraborate), Colemanite ($CaB_3O_4(OH)_3.H_2O$); Admontite (or Admontit or Admontita ($MgB_6O_{10}.7H_2O$)); etc. In addition, the precipitates may include organics, e.g., polyacrylic acid, trihalomethane precursors, pesticides, algae and bacteria, Asp, Glu, Gly, Ser rich acidic glycoproteins, and other highly charge moieties The dried product may be disposed of or employed in a number of different ways. In certain embodiments, the precipitate product is transported to a location for long term storage. Such embodiments find use where CO2 sequestration is desired, since the product can be transported to a location and maintained as a storage stable above ground $CO_2$ sequestering material. For example, the carbonate precipitate may be stored at a long term storage site adjacent to the power plant and precipitation system. In yet other embodiments, the precipitate may be transported and placed at long term storage site, e.g., above ground, below ground, etc. as desired, where the long term storage site is distal to the desalination plant (which may be desirable in embodiments where real estate is scarce in the vicinity of the desalination plant). In these embodiments, the precipitate finds use as an above-ground storage stable form, so that $CO_2$ is no longer present as, or available to be, a gas in the atmosphere. As such, sequestering of $CO_2$ according to methods of the invention results in prevention of $CO_2$ gas from entering the atmosphere and long term storage of $CO_2$ in a manner that $CO_2$ does not become part of the atmosphere. By above-ground storage stable form is meant a form of matter that can be stored above ground under exposed conditions (i.e., open to the atmosphere) without significant, if any, degradation for extended durations, e.g., 1 year or longer, 5 years or longer, 10 years or longer, 25 years or longer, 50 years or longer, 100 years or longer, 250 years or longer, 1000 years or longer, 10,000 years or longer, 1,000,000 years or longer, or even 100,000,000 years or longer. As the storage stable form undergoes little if any degradation while stored above ground under normal rain water pH, the amount of degradation if any as measured in terms of $CO_2$ gas release from the product will not exceed 5%/year, and in certain embodiments will not exceed 1%/year. The above-ground storage stable forms are storage stable under a variety of different environment conditions, e.g., from temperatures ranging from $-100°$ C. to $600°$ C. humidity ranging from 0 to 100% where the conditions may be calm, windy or stormy.

In certain embodiments, the carbonate compound precipitate produced by the methods of the invention is employed as a building material. An additional benefit of certain embodiments is that $CO_2$ employed in the process which may be obtained from a gaseous waste stream is effectively sequestered in the built environment. By building material is meant that the carbonate mineral is employed as a construction material for some type of manmade structure, e.g., buildings (both commercial and residential), roads, bridges, levees, dams, and other manmade structures etc. The building material may be employed as a structure or nonstructural component of such structures. In such embodiments, the precipitation plant may be co-located with a building products factory.

In certain embodiments, the precipitate product is refined (i.e., processed) in some manner prior to subsequent use. Refinement as illustrated in step 80 of FIG. 1 may include a variety of different protocols. In certain embodiments, the product is subjected to mechanical refinement, e.g., grinding, in order to obtain a product with desired physical properties, e.g., particle size, etc. In certain embodiments, the precipitate is combined with a hydraulic cement, e.g., as a supplemental cementitious material, as a sand, as an aggregate, etc. In certain embodiments, one or more components may be added to the precipitate, e.g., where the precipitate is to be employed as a cement, e.g., one or more additives, sands, aggregates, supplemental cementitious materials, etc. to produce a final product, e.g., concrete or mortar, 90.

In certain embodiments, the carbonate compound precipitate is utilized to produce aggregates. Such aggregates, methods for their manufacture and use are described in co-pending U.S. Application Ser. No. 61/056,972, filed on May 29, 2008, the disclosure of which is herein incorporated by reference.

In certain embodiments, the carbonate compound precipitate is employed as a component of a hydraulic cement. The term "hydraulic cement" is employed in its conventional sense to refer to a composition which sets and hardens after combining with water. Setting and hardening of the product produced by combination of the cements of the invention with an aqueous fluid results from the production of hydrates that are formed from the cement upon reaction with water, where the hydrates are essentially insoluble in water. Such carbonate compound component hydraulic cements, methods for their manufacture and use are described in co-pending U.S. application Ser. No. 12/126,776 filed on May 23, 2008; the disclosure of which application is herein incorporated by reference.

Utility

The subject methods find use in any situation where it is desired to treat desalinate water. Practice of methods of the invention can provide numerous advantages for desalination protocols. For example, practice of the methods can be used to increase desalination efficiency, e.g., by reducing membrane fouling and scaling. Embodiments of the invention results in decreased membrane scaling as compared to control processes in which a carbonate compound precipitation step is not employed. Membrane scaling may be assessed using the protocols described in Rahardianto et al., Journal of Membrane Science, (2007) 289:123-137. For example, membrane scaling may be assessed by flux decline measurements and post-operation membrane surface image analysis, e.g., as described in Rahardianto et al., supra. Practice of embodiments of the subject methods results in flux decline over a 24 hour test period of 25% or less, such at 15% or less, including 10% or even 5% or less, and in certain embodiments results in substantially no, if any, flux decline. Practice of the methods of invention can provide water recovery rates of 90% or more, such as 95% or more, including 98% or more, e.g., 99% or more. Waste brines that may be treated according to methods of the invention include those having a salinity ranging from 45,000 to 80,000 ppm. Embodiments of the methods produce treated brines having salinities of 35,000 ppm or less. As such, the methods of the invention find use in treating brines so that they are environmentally acceptable, less toxic, etc., than their non-treated waste brine counterparts. Such protocols can result in less environmental deleterious impact, easier compliance with governmental regulations, etc.

In addition, embodiments of the methods result in $CO_2$ sequestration. By "sequestering $CO_2$" is meant the removal or segregation of $CO_2$ from a source, e.g., a gaseous waste stream, and fixating it into a stable non-gaseous form so that the $CO_2$ cannot escape into the atmosphere. By "$CO_2$ sequestration" is meant the placement of $CO_2$ into a storage stable form, such as an above-ground storage stable form, so that it is no longer present as, or available to be, a gas in the atmosphere. As such, sequestering of $CO_2$ according to methods of the invention results in prevention of $CO_2$ gas from entering the atmosphere and long term storage of $CO_2$ in a manner that $CO_2$ does not become part of the atmosphere.

Systems

Aspects of the invention further include systems, e.g., processing plants or factories, for treating desalination waste brine, as described above. Systems of the invention may have any configuration which enables practice of the particular method of interest.

In certain embodiments, the systems include a source of saltwater, e.g., in the form of a structure having an input for salt water. For example, the systems may include a pipeline or analogous feed of saltwater. Where the saltwater source that is desalinated by the system is seawater, the input is in fluid communication with a source of sea water, e.g., such as where the input is a pipe line or feed from ocean water to a land based system or a inlet port in the hull of ship, e.g., where the system is part of a ship, e.g., in an ocean based system.

Also present in systems of the invention is a desalination station or reactor that produces desalinated water and waste brine from saltwater. The desalination station may be configured to perform any of a number of different types of desalination protocols, including, but not limited to, the desalination protocols mentioned above, such as reverse osmosis and multi stage flash distillation protocols.

In addition, the systems will include a carbonate compound precipitation station or reactor that subjects feed water for the desalination station and/or salt waste brine produced by the desalination station to carbonate compound precipitation conditions, e.g., as described above, and produces a precipitated carbonate compound composition and alkaline-earth-metal depleted water, e.g., softened feedwater for the desalination plant or treated brine from the desalination plant. Systems of the invention may further include a separator for separating a precipitate from a mother liquor. In certain embodiments, the separator includes a filtration element.

The system may also include a separate source of carbon dioxide, e.g., where the system is configured to be employed in embodiments where the saltwater and/or mother liquor is contacted with a carbon dioxide source at some time during the process. This source may be any of those described above, e.g., a waste feed from an industrial power plant, etc.

In certain embodiments, the system will further include a station for preparing a building material, such as cement, from the precipitate. This station can be configured to produce a variety of cements from the precipitate, e.g., as described in U.S. application Ser. No. 12/126,776 filed on May 23, 2008; the disclosure of which applications is herein incorporated by reference.

The system may be present on land or sea. For example, the system may be land based system that is in a coastal region, e.g., close to a source of sea water, or even an interior location, where water is piped into the system from a salt water source, e.g., ocean. Alternatively, the system bay a water based system, i.e., a system that is present on or in water. Such a system may be present on a boat, ocean based platform etc., as desired.

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

Experimental

I. P00099 Precipitate

In the following example, the methodology used to produce a carbonate precipitate from seawater (i.e., the P00099 precipitate), as well as the chemical and physical characteristics of the generated precipitate, are described. In addition, the compressive strengths and shrinkage properties of a blended cement made up of 80% ordinary Portland cement (OPC) and 20% P00099 are reviewed. The following examples demonstrate that water may be softened in a reaction that employs $CO_2$ gas and the product precipitate finds use as a building material.

A. Precipitation Reaction

The following protocol was used to produce the P00099 precipitate. 380 L of filtered seawater was pumped into a cylindrical polyethylene 60°-cone bottom graduated tank. This reaction tank was an open system, left exposed to the ambient atmosphere. The reaction tank was constantly stirred using an overhead mixer. pH, room temperature, and water temperature were constantly monitored throughout the reaction.

25 g of granulated (Ca,Mg)O (a.k.a., dolime or calcined dolomite) was mixed into the seawater. Dolime that settled to the bottom of the tank was manually re-circulated from the bottom of the tank through the top again, in order to facilitate adequate mixing and dissolution of reactants. A second addition of 25 g of dolime was performed in an identical manner, including a manual recirculation of settled reactant. When the pH of the water reached 9.2, a gas mixture of 10% $CO_2$ (and 90% compressed air) was slowly diffused through a ceramic airstone into solution. When the pH of the solution fell to 9.0, another 25 g addition of dolime was added to the reaction tank, which caused the pH to rise again. The additions of dolime were repeated whenever the pH of the solution dropped to 9.0 (or below), until a total of 225 g were added. A manual recirculation of settled reactant was performed in between each dolime addition.

After the final addition of dolime, the continuous diffusion of gas through the solution was stopped. The reaction was stirred for an additional 2 hours. During this time, the pH continued to rise. To maintain a pH between 9.0 and 9.2, additional gas was diffused through the reaction when the pH rose above 9.2 until it reached 9.0. Manual re-circulations of settled reactant were also performed 4 times throughout this 2 hour period.

2 hours after the final addition of dolime, stirring, gas diffusion and recirculation of settled reactant was stopped. The reaction tank was left undisturbed for 15 hours (open to the atmosphere).

After the 15 hour period, supernatant was removed through the top of the reaction tank using a submersible pump. The remaining mixture was removed through the bottom of the tank. The collected mixture was allowed to settle for 2 hours. After settling, the supernatant was decanted. The remaining slurry was vacuum filtered through 11 μm pore size filter paper, in a Büchner funnel. The collected filter cake was placed into a Pyrex dish and baked at 110° C. for 24 hours.

The dried product was ground in a ball mix and fractioned by size through a series of sieves to produce the P00099 precipitate.

B. Materials Analysis

Of the different sieve fractions collected, only the fraction containing particles retained on the 38 μm-opening sieve and passing through the 75 μm-opening sieve was used.

1. Chemical Characteristics

The P00099 precipitate used for the blend were analyzed for elemental composition using XRF. Results for the main elements are reported for the Quikrete type I/II Portland cement used in this blend as well as for the P00099 precipitate. In Table 1, below.

TABLE 1

Table 1: XRF analysis of the type I/II portland cement and P00099-002 used in this blend

| Sample | $Na_2O$ % | MgO % | $Al_2O_3$ % | $SiO_2$ % | $P_2O_5$ ppm | $SO_3$ % | Cl % | $K_2O$ % | CaO % | $Fe_2O_3$ % | Sr ppm | $CO_3$ % diff. |
|---|---|---|---|---|---|---|---|---|---|---|---|---|
| OPC1 | 2.15 | 1.95 | 4.32 | 20.31 | 2336 | 2.54 | 0.072 | 0.36 | 62.88 | 3.88 | 1099 | 0.002 |
| P00099 | 1.36 | 3.44 | 0.14 | 0.083 | 462 | 0.65 | 1.123 | 0.04 | 45.75 | 0.12 | 3589 | 46.82 |

The XRD analysis of this precipitate indicates the presence of aragonite and magnesium calcite (composition close to $Mg_{0.1}Ca_{0.9}CO_3$) and in minor amounts, brucite and halite (Table 2).

TABLE 2

| Sample | Aragonite | Magnesium Calcite | Brucite | Halite |
|---|---|---|---|---|
| P00099 | 79.9 | 17.1 | 2.8 | 0.2 |

The total inorganic carbon content measured by coulometry is in fair agreement with the same value derived from the XRD Rietveld estimated composition coupled with XRF elemental composition. Table 3 provides a coulometric analysis of P00099 compared to % C derived from XRD/XRF data

TABLE 3

| Total C from coulometry | Total C derived from other analytical data |
|---|---|
| 10.93 ± 0.16% | 11.5% |

2. Physical Characteristics

SEM observations on the precipitate confirm the dominance of aragonite (needle-like) as well as the size of the particle agglomerates. The determined BET specific surface areas ("SSA") of the Portland cement and the P00099 precipitate are given in Table 4.

TABLE 4

| Type I/II Quikrete Portland cement | P00099 |
|---|---|
| 1.18 ± 0.04 m²/g | 8.31 ± 0.04 m²/g |

The particle size distribution was determined after 2 min of pre-sonication to dissociate the agglomerated particles.

C. OPC/P00099 Blended Cement

The P00099 precipitate was blended with ordinary Portland cement (OPC) by hand for approximately two minutes just before mixing the mortar. The blended cement comprised 20% (w/w) P00099 and 80% (w/w) OPC.

1. Compressive Strengths

The compressive strength development was determined according to ASTM C109. Mortar cubes of 2" side were used for the compression tests. A replacement level of 20% was investigated for this precipitate and compared to plain Portland type I/II cement mortars and to Portland type I/II cement substituted by fly ash F. The water/cement ratio was adjusted to 0.58 to meet the flow criterion of 110%+/−5% (value: 107%).

6 cubes were prepared for the blends. Changes to the ASTM C511 storage conditions were as follows:
  The cubes were cured under a wet towel for 24 hours (estimated relative humidity of 95%)
  After demolding, the cubes were stored in the laboratory at a relative humidity of 30-40% instead of the lime bath.

Figure 2:
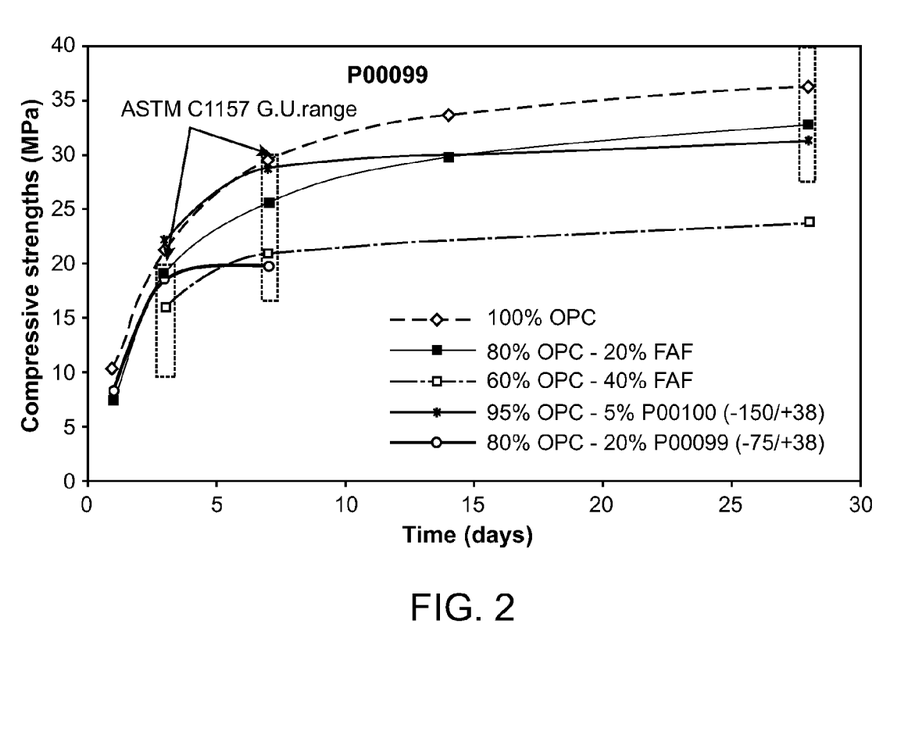
FIG. 2 provides a graph of strength attainment results as determined for various Portland cement blends, including blends comprising a carbonate compound precipitate according to an embodiment of the invention, as described in greater detail in the Experimental Section, below.

Data for a 5% replacement level was also investigated with a duplicate precipitate (P00100, BET specific surface area of ca. 11 m²/g). The water/cement ratio was adjusted to 0.54 to meet the 110% flow requirement. At a 5% level of replacement, the strength development is similar to that of plain portland cement. The results are summarized in the Graph provided in FIG. 2.

2. Shrinkage

The drying shrinkage of mortar bars at a replacement level of 5% and 20% was investigated for the P00099 precipitate following ASTM C596. It was compared to similar bars made with Portland cement type I/II only or a blend of Portland cement and fly ash F. The water/cement ratio was adjusted to 0.50 to meet the flow criterion of 110%+/−5% (value: 107%), and in one set of specimens a Daracem plasticizer was added to achieve a water/cement ratio of 0.45. Changes to the ASTM C596 storage conditions were as follows: the relative humidity in the lab is closer to 30-40% than the 50% recommended by ASTM C596, increasing the drying potential. The results are summarized in Table 6 below.

II. Production of Large Aragonite Crystals of High Purity

A. Precipitate P00143:

390 L of seawater (source: Long Marine Lab, UCSC, Santa Cruz, Calif.) (Water temperature=23.5-24.5° C. Initial pH=7.72) was pumped into a cone-bottom plastic tank. 1 M NaOH solution was slowly added to the seawater using an automated pH controller, while continuously stirring, until the pH was raised to 9.10. A gas mixture of 10% $CO_2$ and 90% air was diffused through the seawater, acidifying the seawater and increasing the dissolved carbon. The pH controller was set to automatically add small amounts of NaOH solution, countering the acidifying effects of the gas mixture, to maintain a pH between 9.00 and 9.10. The gas mixture and NaOH solution were continuously added over a period of about 4 hours, until a total of 12.0 kg of NaOH solution had been added.

Stirring was stopped, and the water was allowed to settle for 15 hours. Most of the (~380 L) supernatant was pumped out of the tank. The remaining supernatant and settled precipitate was removed from the tank as a slurry. The slurry was vacuum filtered using 11 μm pore size filter paper. The filter cake was dried in a 110° C. oven for 6 hours.

The dried product was a fine off-white powder. Analysis by SEM, EDS, XRD and carbon coulometry indicated that the product was over 99% aragonite ($CaCO_3$). SEM showed two major aragonite morphologies present: smaller spikey "stars" and larger "broccoli" shapes, either as individuals or agglomerations. "Stars" were typically 5 μm in diameter. Individual "broccoli" were typically 10-15 μm in length. Agglomerated "broccoli" sizes ranged widely, but were in the range of 20-50 μm in diameter.

B. Precipitate P00145:

(Water temperature=24.0-25.7° C. Initial pH=7.84) 390 L of seawater (source: Long Marine Lab, UCSC, Santa Cruz, Calif.) was pumped into a cone-bottom plastic tank. 2 M NaOH solution was slowly added to the seawater using an automated pH controller, while continuously stirring, until the pH was raised to 9.10. A gas mixture of 10% CO2 and 90% air was diffused through the seawater, acidifying the seawater and increasing the dissolved carbon. The pH controller was set to automatically add small amounts of NaOH solution, countering the acidifying effects of the gas mixture, to maintain a pH between 9.00 and 9.10. The gas mixture and NaOH solution were continuously added over a period of about 5 hours, until a total of 12.4 kg of NaOH solution had been added. Stirring was stopped, and the water was allowed to settle for 65 hours. Most of the (~380 L) supernatant was pumped out of the tank. The remaining supernatant and settled precipitate was removed from the tank as a slurry. The

TABLE 6

| | | Cement composition | | | | Duration (weeks) | | | | |
|---|---|---|---|---|---|---|---|---|---|---|
| Mix description | W/C | OPC | SCM | FA | Flow | 1 | 2 | 3 | 4 | 6 |
| 100% OPC baseline | 0.40 | 100% | 0% | 0% | 105% | 0.034% | 0.052% | 0.056% | | 0.075% |
| 80% OPC - 20% FAF1-1 | 0.40 | 80% | 0% | 20% | 118% | 0.034% | 0.054% | 0.067% | | |
| 80% OPC - 20% P00099 | 0.5 | 80% | 20% | 0% | 118% | 0.043% | 0.080% | 0.099% | 0.104% | |
| 80% OPC - 20% P00099 + Daracem | 0.45 | 80% | 20% | 0% | 108% | 0.050% | 0.110% | 0.198% | 0.207% | | slurry was vacuum filtered using 11 µm pore size filter paper. The filter cake was dried in a 110° C. oven for 6 hours.

The dried product was a fine off-white powder. Analysis by SEM, EDS, XRD and carbon coulometry indicated that the product was over 99% aragonite ($CaCO_3$). SEM showed that the solid was predominately composed of "broccoli" agglomerations. Agglomerated "broccoli" sizes ranged widely, but were in the range of 20-50 µm in diameter.

Figure 3A:
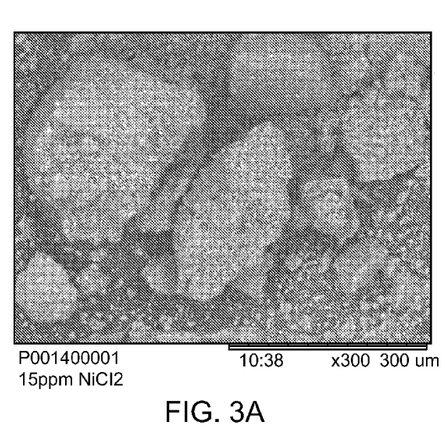
FIGS. 3A to 3C provide SEM micrographs of a precipitate produced as described in the Experimental section below.
Figure 3B:
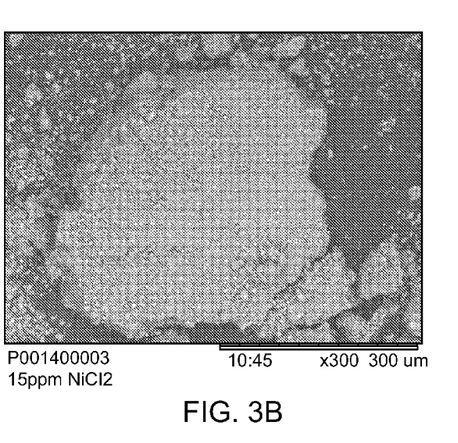
Figure 3C:
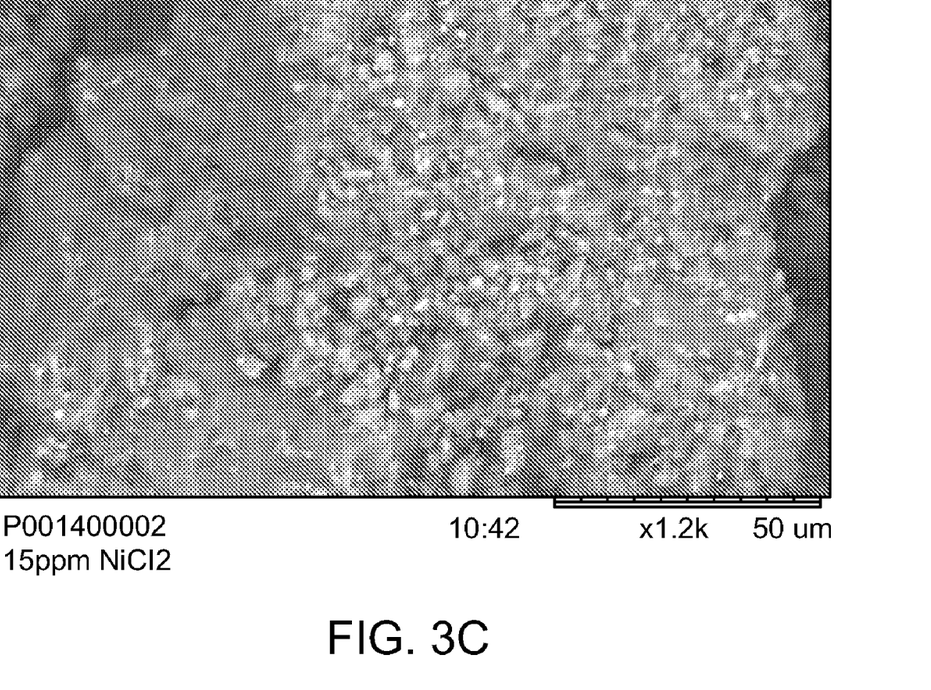
Figure 4:
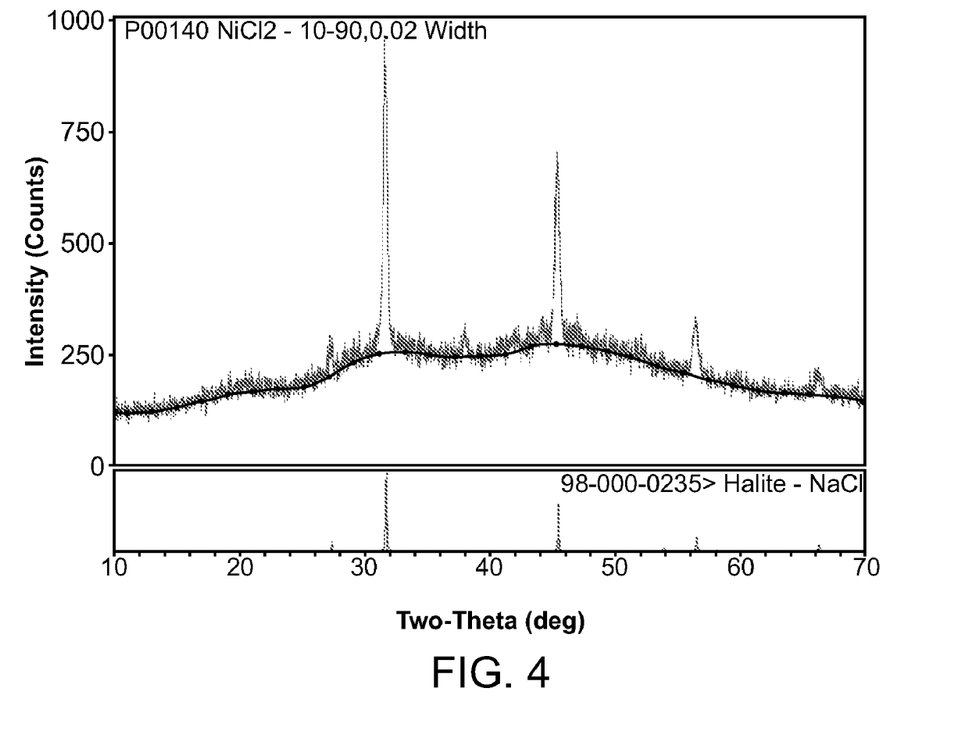
FIG. 4 provides an FTIR of a precipitate produced as described in the Experimental section below.

III. Control of Precipitate Particle Size with Nickel Catalysis of Carbonate Precipitation A. Experimental Procedure for P00140, 1. Methods:
    1 L Seawater dosed with 15 ppm $NiCl_2$
    1. 1 L of Seawater, Starting pH=8.10 T=21.4° C.
    2. Add 15 ppm of $NiCl_2$ to Seawater
    3. Titrate 55 ml of 1M NaOH countered by $CO_2$ gas to maintain a pH range between 8.0-10.2, including a pH range between 8.8-9.8
    Final pH=9.73 T=22.0. Duration of experiment: 19 minutes. Filter using vacuum filtration on 11 µm filter paper. Settling Time before filtration: 15 minutes. Oven Dried at 110° C. for 24 hours 2. Results The above protocol yields 1.14 g of Precipitate. The resultant precipitate has particle sizes ranging up to 500 µm (control experiments with no nickel produce particle size ranging from 5-20 µm), as illustrated in SEM micrographs, shown in FIGS. 3A to 3C. Fully Amorphous Crystal Structure observed, as illustrated in FTIR (See FIG. 4). Ca:Mg ratio's of 4:1 and 3:1 in precipitate.

In precipitative softening of feedstock water for desalination processes, the particle sizes of the precipitates are generally very fine, and require substantial mechanical filtration to prevent clogging of the reverse osmosis membranes. In embodiments of the current invention, the size and composition of the precipitated material is controlled to reduce or eliminate the need for high energy mechanical filtration of the feedstock prior to reverse osmosis, e.g., by including a transition metal catalyst as described above.

These results contrast with the results achieved without a Nickel catalyst, e.g., as described for P00143 and P00145, above.

IV. Identification of Boron in Carbonate Compound Precipitate

Precipitate P00144 was prepared according to the same procedure as that employed for the preparation of P00143, described above. Precipitate P00144 was analyzed for Boron content via inductively coupled plasma-mass spectrometry. Boron was found to present in the precipitate at an amount of 109 µg/g. This finding equates to 0.109 mg/L Boron in ppt (assuming 1 g/L ppt). Noting that there is 0.00042 mol B/~L [SW]*10.8 g/mol→4.5 mg B/L in Seawater, it was determined that approximately 2.5% of the B in seawater is being taken in by the ppt.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

That which is claimed is:

1. A water-desalination method comprising:
    contacting a saltwater with an industrial waste gas stream from a power plant under alkaline-earth-metal-ion precipitating conditions to form an alkaline-earth-metal-ion-depleted water and an alkaline earth metal carbonate compound precipitate comprising calcium carbonate that comprises vaterite, aragonite, amorphous calcium carbonate, or any combination thereof, further wherein precipitate formation does not generate carbon dioxide;
    separating and drying the carbonate compound precipitate comprising calcium carbonate that comprises vaterite, aragonite, amorphous calcium carbonate, or any combination thereof to form a dried carbonate composition; and
    supplying the alkaline-earth-metal-ion-depleted water to a desalination process.

2. The method according to claim 1, wherein said desalination process comprises a distillation protocol, a membrane protocol, or a combination thereof.

3. The method according to claim 1, wherein said carbonate compound precipitation process is performed on said saltwater prior to subjecting said saltwater to said desalination process to produce a desalinated water and a waste brine.

4. The method according to claim 3, wherein said carbonate compound precipitation process is performed on said waste brine to produce treated waste brine.

5. The method according to claim 1, wherein said carbonate compound precipitation conditions also precipitate boron containing compounds.

6. The method according to claim 1, wherein said feed water comprises sea water, brackish water, a brine, or any combination thereof.

7. The method according to claim 1, wherein said carbonate compound precipitation process employs a transition metal catalyst.

8. The method according to claim 1, wherein said method further comprises employing a carbonate compound precipitate of said carbonate compound precipitation process as a building material.

9. The method according to claim 8, wherein said building material is a concrete.

10. The method of claim 1 wherein the carbonate composition comprises vaterite.

11. The method of claim 1 wherein the carbonate composition comprises aragonite.

12. The method according to claim 1 wherein the carbonate composition comprises amorphous calcium carbonate.

13. The method of claim 1 wherein said carbonate composition comprises strontium in an amount from 3 to 10,000 ppm.

* * * * *